(12) United States Patent
Okazaki et al.

(10) Patent No.: US 11,916,437 B2
(45) Date of Patent: Feb. 27, 2024

(54) IPM ROTOR

(71) Applicant: Mitsubishi Electric Corporation, Tokyo (JP)

(72) Inventors: Masafumi Okazaki, Tokyo (JP); Natsumi Sugi, Tokyo (JP); Yu Hirotani, Tokyo (JP); Akihiko Mori, Tokyo (JP); Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 507 days.

(21) Appl. No.: 17/263,962

(22) PCT Filed: Nov. 1, 2018

(86) PCT No.: PCT/JP2018/040720
§ 371 (c)(1),
(2) Date: Jan. 28, 2021

(87) PCT Pub. No.: WO2020/090086
PCT Pub. Date: May 7, 2020

(65) Prior Publication Data
US 2021/0234419 A1 Jul. 29, 2021

(51) Int. Cl.
*H02K 1/27* (2022.01)
*H02K 1/276* (2022.01)
*H02K 1/30* (2006.01)

(52) U.S. Cl.
CPC .............. *H02K 1/276* (2013.01); *H02K 1/30* (2013.01); *H02K 2213/03* (2013.01)

(58) Field of Classification Search
CPC ...... H02K 1/276; H02K 1/30; H02K 2213/03; H02K 1/28
See application file for complete search history.

(56) References Cited

U.S. PATENT DOCUMENTS

| 2013/0002082 A1* | 1/2013 | Utsumi ................ H02K 1/2746 29/598 |
|---|---|---|
| 2016/0248286 A1 | 8/2016 | Kaiser et al. |
| 2020/0036244 A1* | 1/2020 | Aida .................... H02K 1/2766 |

FOREIGN PATENT DOCUMENTS

| JP | 2011-172441 A | 9/2011 |
|---|---|---|
| JP | 2014-090575 A | 5/2014 |
| JP | 2015-076956 A | 4/2015 |

(Continued)

OTHER PUBLICATIONS

International Search Report for PCT/JP2018/040720 dated Feb. 5, 2019 [PCT/ISA/210].

(Continued)

*Primary Examiner* — Thomas Truong
(74) *Attorney, Agent, or Firm* — Sughrue Mion, PLLC; Richard C. Turner

(57) ABSTRACT

In an IPM rotor, a first core sheet has a first sheet hole forming a part of an accommodation hole. The first sheet hole has an edge portion having a flat spring portion which is bent by a magnet through insertion of the magnet into the accommodation hole. A pair of recesses forming a clearance with respect to the magnet are formed at both side portions of the flat spring portion of the edge portion of the first sheet hole. A size of the clearance is set based on a relationship between a magnitude of a pressing force of the flat spring portion on the magnet and variation in pressing force.

8 Claims, 7 Drawing Sheets

(56) References Cited

FOREIGN PATENT DOCUMENTS

| | | |
|---|---|---|
| JP | 2015-154665 A | 8/2015 |
| WO | 2013/091803 A2 | 6/2013 |
| WO | 2018/189822 A1 | 10/2018 |

OTHER PUBLICATIONS

Extended European Search Report dated Oct. 22, 2021 in European Application No. 18938297.1.

* cited by examiner

IPM ROTOR

CROSS REFERENCE TO RELATED APPLICATIONS

This application is a National Stage of International Application No. PCT/JP2018/040720 filed Nov. 1, 2018.

TECHNICAL FIELD

This invention relates to an interior permanent magnet (IPM) rotor in which a magnet is accommodated in an accommodation hole of a rotor core.

BACKGROUND ART

In a related-art IPM rotor, a rotor core has a magnet insertion hole. The magnet insertion hole has an inner wall surface having a flat spring portion projecting into the magnet insertion hole. When a magnet is inserted into the magnet insertion hole, the flat spring portion is elastically deformed. With this, a pressing force is applied to the magnet. This pressing force is adjusted based on a length of the flat spring portion (see, for example, Patent Literature 1).

CITATION LIST

Patent Literature

[PTL 1] JP 2015-76956 A

SUMMARY OF INVENTION

Technical Problem

In the related-art IPM rotor described above, the pressing force to be applied from the flat spring portion to the magnet is adjusted based only on the length of the flat spring portion. Therefore, it is difficult to ensure a stable pressing force.

This invention has been made to solve the problem described above, and has an object to obtain an IPM rotor capable of further stabilizing a pressing force on a magnet.

Solution to Problem

According to one embodiment of this invention, there is provided an IPM rotor, including: a rotor core which includes a plurality of core sheets, and has an accommodation hole; and a magnet accommodated in the accommodation hole, wherein the plurality of core sheets include a first core sheet and a second core sheet, wherein the first core sheet has a first sheet hole forming a part of the accommodation hole, wherein the second core sheet has a second sheet hole forming a part of the accommodation hole, wherein the first sheet hole has an edge portion having a flat spring portion which is bent by the magnet through insertion of the magnet into the accommodation hole, wherein the second sheet hole has an edge portion having a concave portion which allows the flat spring portion bent by the magnet to escape, wherein a pair of recesses forming a clearance with respect to the magnet are formed at both side portions of the flat spring portion of the edge portion of the first sheet hole, and wherein a size of the clearance is set based on a relationship between a magnitude of a pressing force of the flat spring portion on the magnet and variation in the pressing force.

Advantageous Effects of Invention

In the IPM rotor according to this invention, the size of the clearance is set based on the relationship between the magnitude of the pressing force of the flat spring portion on the magnet and the variation in the pressing force. Therefore, the pressing force on the magnet can be further stabilized.

DESCRIPTION OF EMBODIMENTS

Now, embodiments for carrying out this invention are described with reference to the drawings.

First Embodiment

Figure 1:
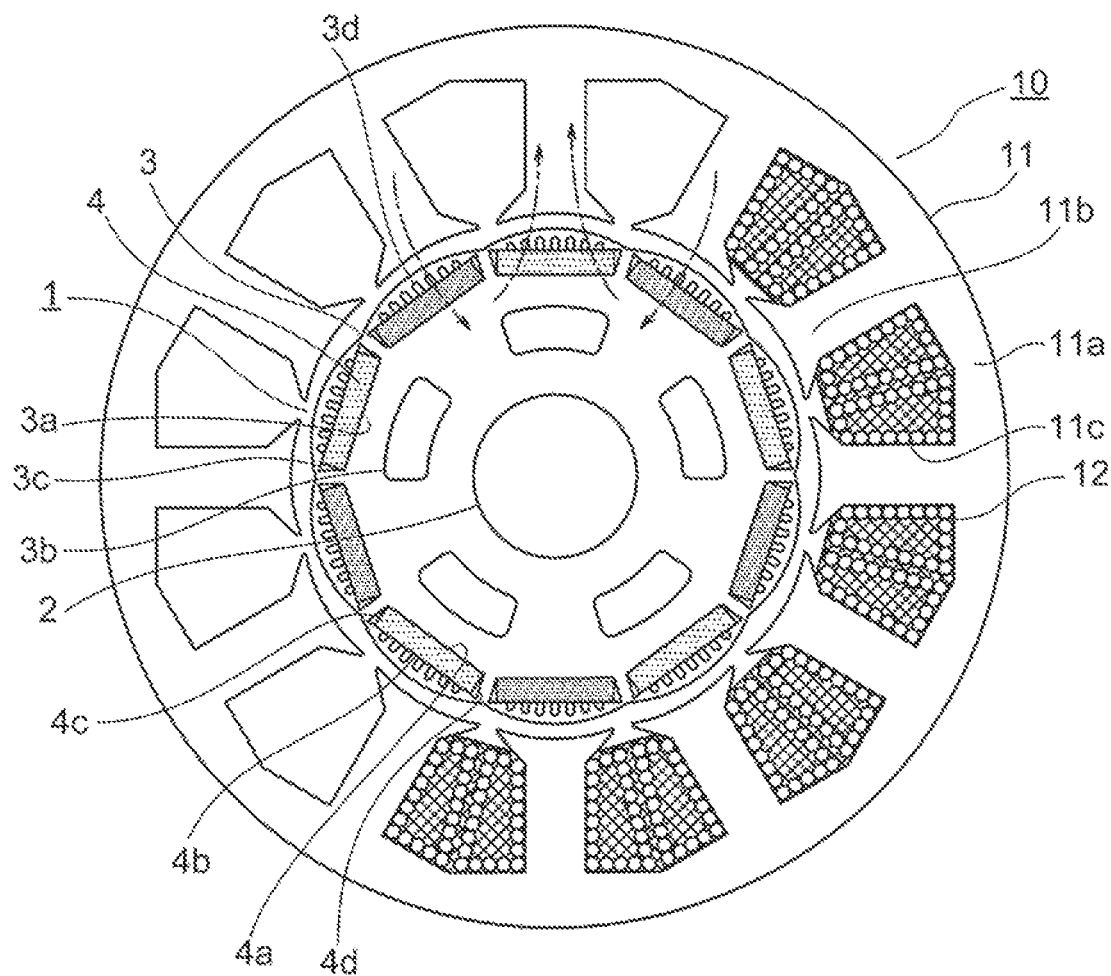
FIG. 1 is a sectional view of a rotating electric machine in a first embodiment of this invention.

FIG. 1 is a sectional view of a rotating electric machine of a first embodiment of this invention. In FIG. 1, the rotating electric machine includes an IPM rotor 1 and a stator 10. The IPM rotor 1 includes a rotary shaft 2, a rotor core 3, and a plurality of magnets 4.

The rotor core 3 is fixed to the rotary shaft 2 and rotates integrally with the rotary shaft 2. The rotary shaft 2 passes through a center of the rotor core 3. The rotor core 3 is formed by laminating a plurality of core sheets, which are described later, in an axial direction of the rotor core 3.

The rotor core 3 has a plurality of accommodation holes 3a. The accommodation holes 3a are each formed continuously along the axial direction of the rotor core 3. Further, the plurality of accommodation holes 3a are arranged apart from each other in a circumferential direction of the rotor core 3.

Further, the plurality of accommodation holes 3a are arranged in the vicinity of an outer peripheral surface of the rotor core 3 and at the same position in a radial direction of the rotor core 3. Further, the accommodation holes 3a are each arranged along an arc of a circle having its center at a rotation center of the rotor core 3.

The magnets 4 are each accommodated in a corresponding one of the accommodation holes 3a. The number of accommodation holes 3a is the same as the number of magnets 4. In this example, ten magnets 4 are used. Further, permanent magnets are used as the magnets 4. Further, the magnets 4 each have an outer shape of a rectangular parallelepiped.

Further, when seen on a cross section perpendicular to the rotation center of the rotor core 3, the magnets 4 each have a rectangular sectional shape including a first long side 4a, a second long side 4b, a first short side 4c, and a second short side 4d. The first long side 4a is a long side on a radially inner side of the rotor core 3. The second long side 4b is a long side on a radially outer side of the rotor core 3.

Further, the magnets 4 are each magnetized along the radial direction of the rotor core 3. That is, the magnets 4 are each magnetized such that a surface including the first long side 4a and a surface including the second long side 4b serve as magnetic pole surfaces. Further, the magnets 4 are arranged such that N-poles and S-poles are alternately located on the radially outer side of the rotor core 3.

Further, the rotor core 3 has a plurality of lightening holes 3b. The lightening holes 3b are each a hole for reducing the weight of the rotor core 3. Further, the lightening holes 3b are arranged more on the radially inner side of the rotor core 3 than the accommodation holes 3a. In this example, five lightening holes 3b are arranged in point symmetry around a center at the rotation center of the rotor core 3.

The stator 10 includes a stator core 11 and a plurality of stator coils 12. The stator core 11 is arranged coaxially with the IPM rotor 1.

Further, the stator core 11 includes an annular back yoke portion 11a and a plurality of tooth portions 11b. The plurality of tooth portions 11b project from the back yoke portion 11a toward the radially inner side. In this example, twelve tooth portions 11b are formed on the stator core 11.

The tooth portions 11b are arranged apart from each other in the circumferential direction of the stator core 11. A slot 11c is formed between adjacent tooth portions 11b.

The stator coils 12 are each wound around a corresponding one of the tooth portions bib and accommodated in slots 11c adjacent to the corresponding one of the tooth portions 11b. In FIG. 1, half of the stator coils 12 are omitted.

With regard to magnetization, the tooth portions 11b are magnetized by allowing a current to flow through the stator coils 12. With this, for example, magnetic paths indicated by arrows of one-dot chain lines of FIG. 1 are generated.

At this time, when each of the accommodation holes 3a is large with respect to a thickness of the magnet 4, that is, a dimension of the magnet 4 in the radial direction of the rotor core 3, the magnetic paths may be interrupted. Therefore, it is preferred that the dimension of each of the accommodation holes 3a in the radial direction of the rotor core 3 be the same as the thickness of the magnet 4.

Further, spaces 3c are defined on both sides of each of the accommodation holes 3a in a width direction of the magnet 4 so as to block magnetic paths directly connecting magnets 4 which are adjacent to each other. Further, a plurality of projecting holes 3d projecting toward the radially outer side of the rotor core 3 are formed at an edge portion of each of the accommodation holes 3a on the radially outer side of the rotor core 3 so as to block needless magnetic paths.

An outer shape of the rotor core 3 as seen along the axial direction of the rotor core 3 is not a perfect circle, and is a shape obtained by connecting a plurality of arcs projecting toward the radially outer side at positions of the plurality of magnets 4.

Figure 2:
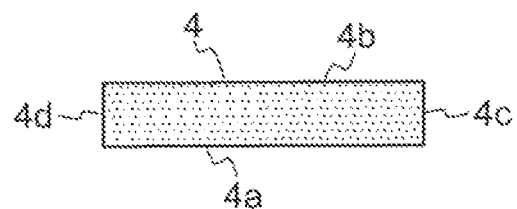
FIG. 2 is an enlarged sectional view for illustrating a magnet of FIG. 1.

FIG. 2 is an enlarged sectional view for illustrating the magnet 4 of FIG. 1. The radial direction of the rotor core 3 and the thickness direction of the magnet 4 correspond to an up-and-down direction of FIG. 2. Further, the width direction of the magnet 4 corresponds to a right-and-left direction of FIG. 2.

Now, the plurality of core sheets forming the rotor core 3 are described. The plurality of core sheets include a first core sheet 20 illustrated in FIG. 3, a second core sheet 30 illustrated in FIG. 4, and a third core sheet 40 illustrated in FIG. 5.

Figure 3:
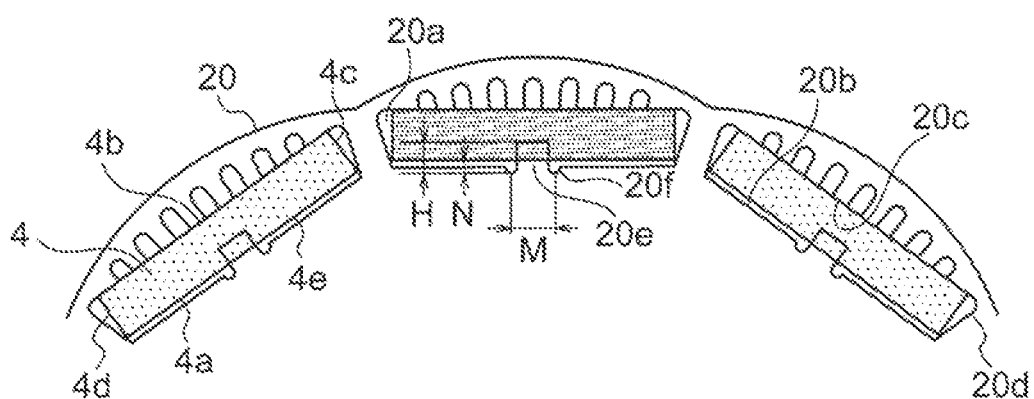
FIG. 3 is a plan view for illustrating a part of a first core sheet of a rotor core of FIG. 1.

In FIG. 3, the first core sheet 20 has a plurality of first sheet holes 20a. The first sheet holes 20a each form a part of a corresponding one of the accommodation holes 3a. Further, the first sheet holes 20a each have a trapezoidal shape.

The first sheet holes 20a each have a first inner edge portion 20b, a first outer edge portion 20c, and a pair of first end edge portions 20d. The first inner edge portion 20b is an edge portion located on the radially inner side of the rotor core 3. The first outer edge portion 20c is an edge portion located on the radially outer side of the rotor core 3. The first end edge portions 20d are edge portions located at both ends of the first sheet hole 20a in the circumferential direction of the rotor core 3. The first inner edge portion 20b is shorter than the first outer edge portion 20c.

A flat spring portion 20e projecting toward the first sheet hole 20a is formed at a center portion of the first inner edge portion 20b of the first sheet hole 20a. The flat spring portion 20e is bent by the magnet 4 through insertion of the magnet 4 into the accommodation hole 3a. However, in FIG. 3, for illustration of the shape of the flat spring portion 20e, the flat spring portion 20e before being bent is illustrated in a state of overlapping the magnet 4.

When seen on a cross section perpendicular to the axial direction of the rotor core 3, the flat spring portion 20e is brought into contact with a center portion of the first long side 4a of the magnet 4. Further, the flat spring portion 20e bent by the magnet 4 presses the magnet 4 against the first outer edge portion 20c.

A contact surface 4e that is a surface of the magnet 4 with which the flat spring portion 20e is brought into contact is a surface including the first long side 4a.

A pair of recesses 20f each forming a clearance with respect to the magnet 4 are formed at both side portions of the flat spring portion 20e of each of the first inner edge portion 20b.

When seen on the cross section perpendicular to the axial direction of the rotor core 3, a dimension of the flat spring portion 20e in a direction perpendicular to the radial direction of the rotor core 3 is referred to as a width M of the flat spring portion 20e. Further, in a state before the flat spring portion 20e is bent by the magnet 4, a dimension of the flat spring portion 20e in the radial direction of the rotor core 3 is referred to as a length H of the flat spring portion 20e.

Figure 4:
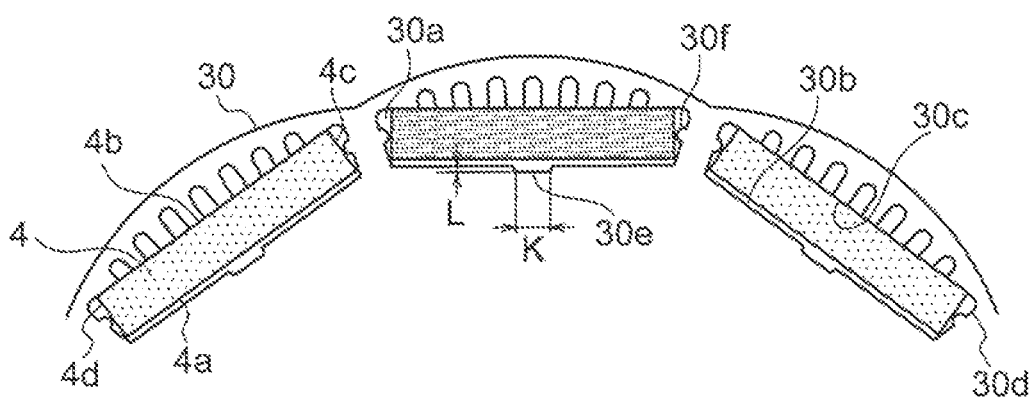
FIG. 4 is a plan view for illustrating a part of a second core sheet of the rotor core of FIG. 1.

In FIG. 4, the second core sheet 30 has a plurality of second sheet holes 30a. The second sheet holes 30a each form a part of a corresponding one of the accommodation holes 3a. Further, the second sheet holes 30a each have a trapezoidal shape.

The second sheet holes 30a each have a second inner edge portion 30b, a second outer edge portion 30c, and a pair of second end edge portions 30d. The second inner edge portion 30b is an edge portion located on the radially inner side of the rotor core 3. The second outer edge portion 30c is an edge portion located on the radially outer side of the rotor core 3. The second end edge portions 30d are edge portions located at both ends of the second sheet hole 30a in the circumferential direction of the rotor core 3. The second inner edge portion 30b is shorter than the second outer edge portion 30c.

A concave portion 30e for allowing the flat spring portion 20e bent by the magnet 4 to escape is formed at a center portion of the second inner edge portion 30b of the second sheet hole 30a.

When seen on the cross section perpendicular to the axial direction of the rotor core 3, a dimension of the concave portion 30e in the direction perpendicular to the radial direction of the rotor core 3 is referred to as a width K of the concave portion 30e. Further, a dimension of the concave portion 30e in the radial direction of the rotor core 3 is referred to as a depth L of the concave portion 30e.

An arc-shaped projection portion 30f projecting toward the second sheet hole 30a is formed at each of the second end edge portions 20d of the second sheet hole 30a. The projection portions 30f are each brought into contact with a corresponding one of the magnets 4 to regulate movement of the magnet 4 in the circumferential direction of the rotor core 3.

Figure 5:
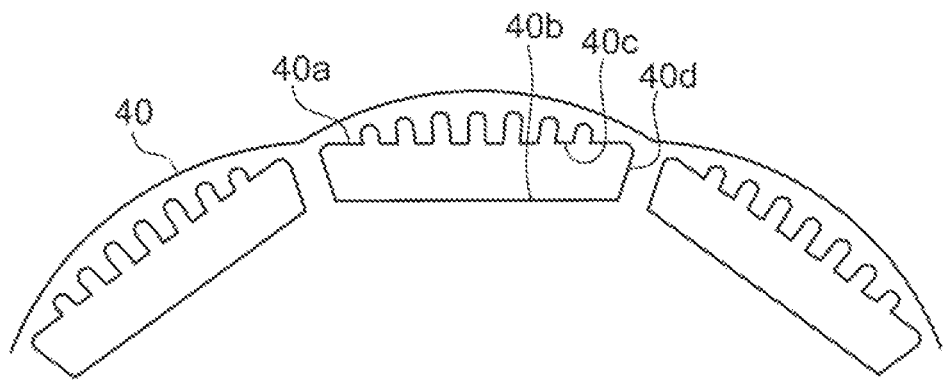
FIG. 5 is a plan view for illustrating a part of a third core sheet of the rotor core of FIG. 1.

In FIG. 5, the third core sheet 40 has a plurality of third sheet holes 40a. The third sheet holes 40a each form a part of a corresponding one of the accommodation holes 3a. Further, the third sheet holes 40a each have a trapezoidal shape. In FIG. 5, the magnet 4 is omitted.

The third sheet holes 40a each have a third inner edge portion 40b, a third outer edge portion 40c, and a pair of third end edge portions 40d. The third inner edge portion 40b is an edge portion located on the radially inner side of the rotor core 3. The third outer edge portion 40c is an edge portion located on the radially outer side of the rotor core 3. The third end edge portions 40d are edge portions located at both ends of the third sheet hole 40a in the circumferential direction of the rotor core 3. The third inner edge portion 40b is shorter than the third outer edge portion 40c.

Further, the third inner edge portions 40b are each opposed to the contact surface 4e of a corresponding one of the magnets 4. Further, the entirety of the third inner edge portion 40b is parallel to the contact surface 4e. That is, neither a flat spring portion nor a concave portion is formed at the third inner edge portion 40b of the third sheet hole 40a.

Figure 6:
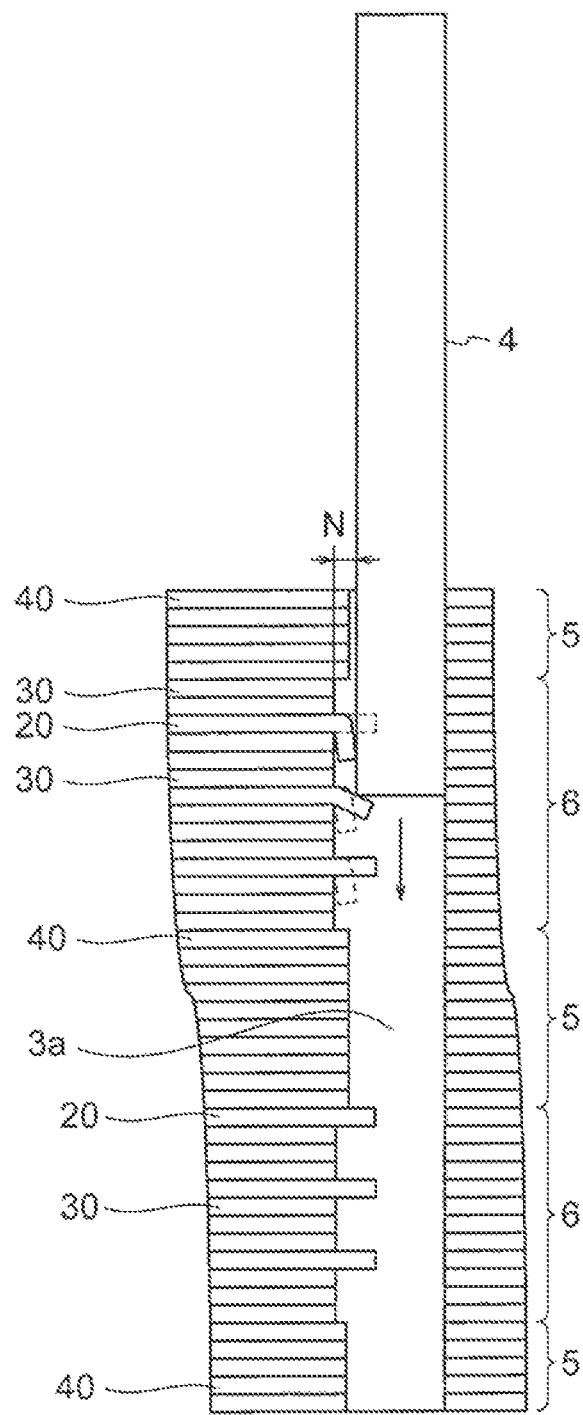
FIG. 6 is a sectional view for illustrating a state in which the magnet is being inserted into an accommodation hole of FIG. 1.

FIG. 6 is a sectional view for illustrating a state in which the magnet 4 is being inserted into the accommodation hole 3a of FIG. 1. Further, FIG. 6 is an illustration of a cross section of the rotor core 3 taken along an axis of the rotor core 3. An up-and-down direction of FIG. 6 corresponds to the axial direction of the rotor core 3, and a right-and-left direction of FIG. 6 corresponds to the radial direction of the rotor core 3.

In the example illustrated in FIG. 6, the rotor core 3 includes three third-core-sheet laminated bodies 5. The third-core-sheet laminated bodies 5 are each formed of a plurality of third core sheets 40 which are successively laminated. Further, the third-core-sheet laminated bodies 5 are arranged at both end portions and a center portion in the axial direction of the rotor core 3.

Further, mixture laminated bodies 6 are each arranged between adjacent third-core-sheet laminated bodies 5. The mixture laminated bodies 6 are each formed of a plurality of first core sheets 20 and a plurality of second core sheets 30 which are combined and laminated.

In each of the mixture laminated bodies 6, a plurality of second core sheets 30 are laminated on one first core sheet 20 to form a group. That is, the first core sheets 20 are arranged at intervals corresponding to the plurality of second core sheets 30.

In FIG. 6, three second core sheets 30 are laminated on one first core sheet 20. Further, in each of the mixture laminated bodies 6, three groups each including a combination of one first core sheet 20 and three second core sheets 30 are used. Further, in the mixture laminated body 6 located on an upstream side in an insertion direction of the magnet 4, two second core sheets 30 are laminated on the upstream side of the first core sheet 20 located on the most upstream side.

When the magnet 4 is inserted downward from an upper end of the accommodation hole 3a of FIG. 6, the magnet 4 first passes through the third-core-sheet laminated body 5. At this time, a dimension of the third sheet hole 40a in the radial direction of the rotor core 3 is slightly larger than a thickness of the magnet 4. Therefore, the magnet 4 is positioned in the thickness direction.

Next, at the time of passing through the second core sheets 30, the magnet 4 is positioned in the width direction by the projection portions 30f.

After that, the magnet 4 arrives at the first sheet hole 20a and bends the flat spring portion 20e in the down direction of FIG. 6. With this, a restoring force of the flat spring portion 20e, that is, a pressing force is applied to the magnet 4. A magnitude of the pressing force is dependent on a material, the width M, and the length H of the flat spring portion 20e.

Here, the first core sheets 20, the second core sheets 30, and the third core sheets 40 are made of the same material. Further, the first core sheets 20, the second core sheets 30, and the third core sheets 40 have the same thickness "t", which is t≈0.3 mm to 0.65 mm. Further, the length H of the flat spring portion 20e is two to three times larger than the thickness "t".

In this case, when about three second core sheets 30 are laminated, a distal end of the bent flat spring portion 20e is prevented from interfering with the next first core sheet 20. Therefore, in FIG. 6, three second core sheets 30 are successively laminated under the first core sheet 20.

The width K of the concave portion 30e is slightly larger than the width M of the flat spring portion 20e. With this, the entirety of the flat spring portion 20e can escape to the concave portion 30e.

A bottom portion of the concave portion 30e serves as a fulcrum for bending the flat spring portion 20e. Therefore, care needs to be taken at the time of setting the depth L of the concave portion 30e. In the first embodiment, a bottom surface of the recess 20f and a bottom surface of the concave portion 30e are located at the same position in the radial direction of the rotor core 3. Further, the length H and the width M of the flat spring portion 20e are important for setting the pressing force.

Further, the magnet 4 is pressed by the flat spring portion 20e toward the radially outer side of the rotor core 3. Therefore, a slight gap is defined between an inner surface of the accommodation hole 3a on the flat spring portion 20e side and the magnet 4. This gap interrupts the magnetic paths. Therefore, it is preferred that the gap be set as small as possible. Meanwhile, it is preferred that the gap be set to such a dimension that the insertion of the magnet 4 is prevented from being difficult.

A dimension of the gap is determined based on dimensional accuracy of the magnet 4, the first core sheets 20, the second core sheets 30, and the third core sheets 40. In the IPM rotor 1 having the dimension described above, the gap can be set within about 0.2 mm.

Next, an important dimension is described with reference to FIG. 7 and FIG. 8. The dimension to be focused on is a dimension of the clearance described above. In FIG. 3 and FIG. 6, the clearance is indicated by N. The length H of the flat spring portion 20*e* does not greatly affect the determination of the pressing force on the magnet 4 when the length H falls within the range described above.

A magnitude of the pressing force of the flat spring portion 20*e* on the magnet 4 changes according to the size of the clearance. Further, it was found out that not only the magnitude of the pressing force but also variation in pressing force change according to the size of the clearance.

Figure 7:
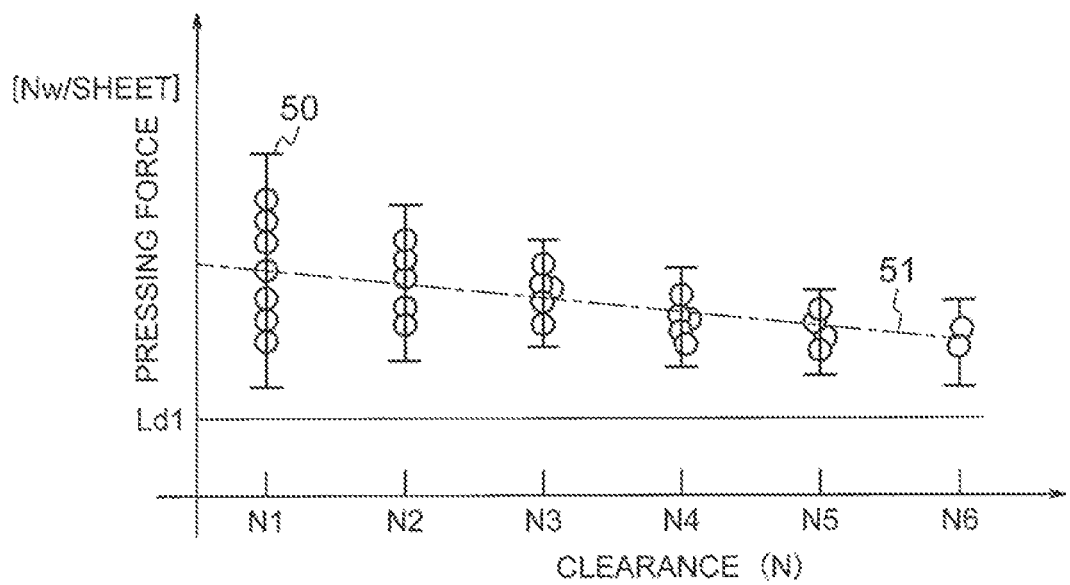
FIG. 7 is a graph for showing a relationship between a size of a clearance of FIG. 3 and a pressing force.

FIG. 7 is a graph for showing a relationship between the size of the clearance of FIG. 3 and the pressing force. The horizontal axis of FIG. 7 represents the size of the clearance. There are given N1 corresponding to 0.35 mm, N2 corresponding to 0.40 mm, N3 corresponding to 0.45 mm, N4 corresponding to 0.50 mm, N5 corresponding to 0.55 mm, and N6 corresponding to 0.60 mm.

Further, the vertical axis of FIG. 7 represents the magnitude of the pressing force per first core sheet 20 in a unit of Newton. Further, a pressing force Ld1 indicates a minimum pressing force on the magnet 4. The minimum pressing force is set to such a value that the magnet 4 cannot be held in a use environment when the pressing force is less than that value.

Specifically, the minimum pressing force is set to about 10 N in consideration of a safety factor. That is, when the pressing force is equal to or larger than 10 N and does not fall below this value, a force that is several times larger than this value is not required. In contrast, when the pressing force is excessively large, the insertion of the magnet 4 is disadvantageously interrupted.

The circles of FIG. 7 indicate actual measured values of the pressing force. Further, a plurality of vertical lines 50 passing through the circles each indicate a variation range 14*a* of the pressing force. Further, a one-dot chain line 51 is a line approximately connecting medians of the variation with a straight line.

As can be understood from FIG. 7, as the clearance is smaller, the pressing force is larger, but the variation in pressing force is also larger. That is, when the clearance is small, the bending angle of the flat spring portion 20*e* bent by the magnet 4 is close to 90 degrees. It was found that the small clearance affects a spring force to cause variation in spring force, in particular, repulsive force.

In contrast, as the clearance is excessively larger, a force for pressing the magnet 4 itself is smaller. Further, the gap described above becomes larger to interrupt the magnetic paths, causing reduction of a magnetic field, that is, reduction in magnetic flux density.

In a case of mass production of the IPM rotor 1, the above-mentioned variation becomes a significant obstacle. In consideration of a thermal change and an aged deterioration, it is preferred that a small dimension which causes less variation be selected. Therefore, in FIG. 7, the clearances N1 and N2 cannot be selected, and it is required that the clearances N3 to N6 be selected. That is, it is required that the dimension of the clearance be from 0.45 mm to 0.60 mm. In consideration of the ease of inserting the magnet 4, the clearance N6 is better in ease of production than the clearance N3.

As described above, in the first embodiment, the size of the clearance is set based on the relationship between the magnitude of the pressing force of the flat spring portion 20*e* on the magnet 4 and the variation in pressing force.

Figure 8:
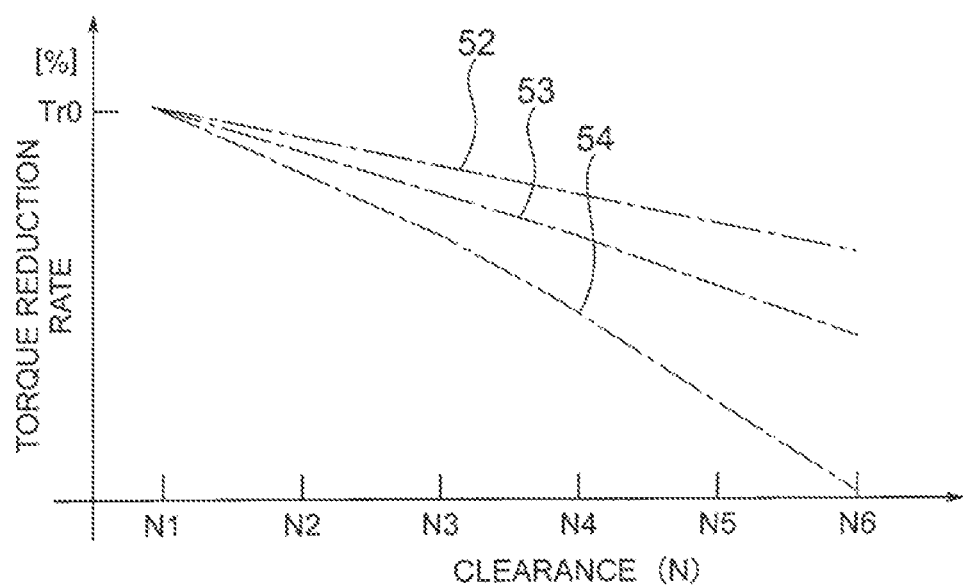
FIG. 8 is a graph for showing a relationship between a size of the clearance of FIG. 3 and a torque reduction rate.

Next, FIG. 8 is a graph for showing a relationship between the size of the clearance of FIG. 3 and a torque reduction rate. Further, FIG. 8 shows reduction of the magnetic field according to the size of the M of FIG. 3 and the size of the K of FIG. 4. In FIG. 8, the K and the M are larger in the order of a line 52, a line 53, and a line 54. A torque Tr0 is a reference point given when the clearance N1 is 1.

As can be understood from FIG. 8, as the clearance is larger, or as the K and the M are larger, torque reduction is greater. Further, an actual measured value of a torque reduction rate on the line 52 at N5 is less than 0.1%. Further, a torque reduction rate on the line 54 at N5 is about 0.2%.

Meanwhile, the width M on the line 52 is around 20% of the length of the first long side 4*a* of the magnet 4. Further, the width M on the line 54 is about 30% of the length of the first long side 4*a*. Thus, it was found that, when such torque reduction rates of the lines 52 to 54 are given, there is no need to pay much attention to the width dimensions K and M.

The width M affects the pressing force on the magnet 4, and the pressing force is determined according to, for example, a rotational acceleration and a thermal distortion of the IPM rotor 1. Further, selection of the pressing force is dependent also on the clearance described above. Further, it is preferred that, in terms of magnetic paths, a smaller width M be selected. In general, the width of the recess 20*f* of FIG. 3 is set to be approximately equal to a minimum dimension in manufacture, for example, the thickness "t" of the first core sheet 20.

As described above, for determination of the dimension of the flat spring portion 20*e*, it is required to particularly focus on the clearance. The size of the clearance is determined in consideration of the variation range of the pressing force on the magnet 4.

Accordingly, the dimension of the clearance is important, and dimensions of parts are determined through determination of other dimensions according to the dimension of the clearance. With this, not only the optimization of the pressing force on the magnet 4 but also the suppression of the variation in pressing force can be achieved, and therefore the reduction of the magnetic field can be prevented.

In the IPM rotor 1 described above, the size of the clearance is set based on the relationship between the magnitude of the pressing force of the flat spring portion 20*e* on the magnet 4 and the variation in pressing force. Therefore, the pressing force on the magnet 4 can be further stabilized.

Further, the bottom surface of the recess 20*f* and the bottom surface of the concave portion 30*e* are located at the same position in the radial direction of the rotor core 3. Therefore, the flat spring portion 20*e* can be stably bent with the bottom surface of the concave portion 30*e* serving as a fulcrum.

Further, the length H of the flat spring portion 20*e* is two to three times larger than the thickness of the first core sheet 20. Therefore, when the thickness of the first core sheet 20 and the thickness of the second core sheet 30 are set to be the same, the lamination of two or three second core sheets 30 allows the flat spring portion 20*e* to escape to the concave portion 30*e*.

Further, two or more second core sheets 30 are successively laminated adjacent to the first core sheet 20. Further, a lamination thickness of the second core sheets 30 which are successively laminated is equal to or larger than the length H of the flat spring portion 20e. Therefore, the flat spring portion 20e is allowed to escape to the concave portion 30e more reliably.

Further, the third core sheets 40 are used in addition to the first core sheets 20 and the second core sheets 30. Therefore, the reduction in torque can be suppressed.

Further, the width M of the flat spring portion 20e is equal to or smaller than 30% of the length of the magnet 4 in the width direction of the flat spring portion 20e. Therefore, the reduction in torque caused by providing the flat spring portion 20e and the concave portion 30e can be suppressed.

Further, the flat spring portion 20e is brought into contact with the center portion of the first long side 4a. In contrast, as illustrated in FIG. 1, the magnetic paths pass on both sides around the center of the magnet 4. Therefore, the reduction of the magnetic field caused by providing the flat spring portion 20e can be suppressed.

At the time of inserting the magnets 4, it is preferred to insert all of magnets 4 having the same direction of magnetic poles and thereafter insert a remainder of magnets 4. That is, when the magnets 4 are inserted every other magnet 4 or every other several magnets 4 into the accommodation holes 3a, bias of the distortion of the rotor core 3 caused by the insertion can be prevented.

Second Embodiment

Next, a second embodiment of this invention is described. A sectional shape of each of accommodation holes of the rotor core of the second embodiment taken along a direction perpendicular to the axial direction is a V-shape that is open toward the radially outer side of the rotor core.

Now, a plurality of core sheets forming the rotor core of the second embodiment are described. The plurality of core sheets include a first core sheet 60 illustrated in FIG. 9, a second core sheet 70 illustrated in FIG. 10, and a third core sheet 80 illustrated in FIG. 11.

Figure 9:
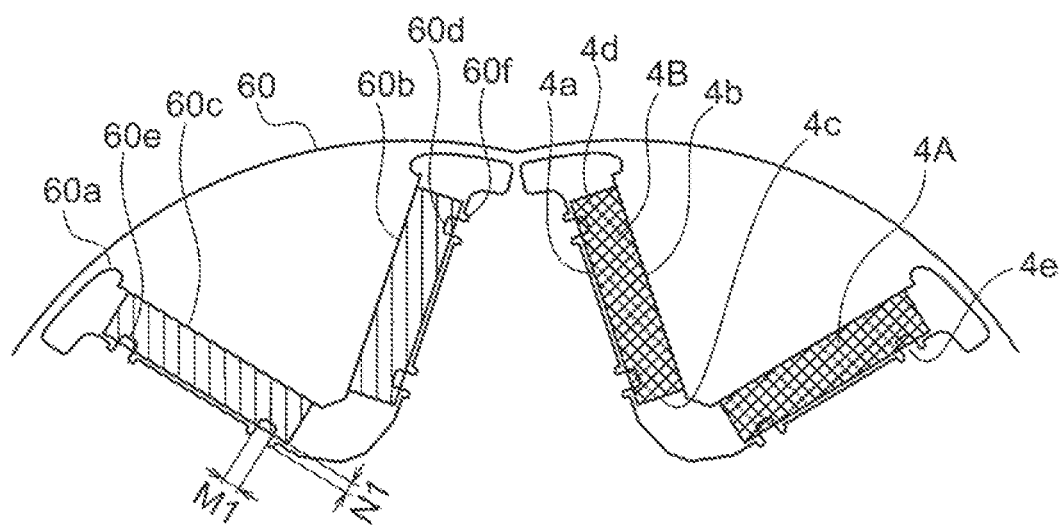
FIG. 9 is a plan view for illustrating a part of a first core sheet of a rotor core of a second embodiment of this invention.

In FIG. 9, the first core sheet 60 has a plurality of first sheet holes 60a. The first sheet holes 60a each form a part of a corresponding one of the accommodation holes. Therefore, a shape of each of the first sheet holes 60a is a V-shape that is open toward the radially outer side of the rotor core.

The first sheet holes 60a each include a first inclination portion 60b and a second inclination portion 60c. The first inclination portion 60b is inclined toward one side with respect to the radial direction of the rotor core. The second inclination portion 60c is inclined toward the other side.

Magnets of the second embodiment include a first magnet 4A and a second magnet 4B. The first magnet 4A is arranged at the first inclination portion 60b. The second magnet 4B is arranged at the second inclination portion 60c. The first magnet 4A and the second magnet 4B each have the same configuration as that of the magnet 4 of the first embodiment.

Flat spring portions of the second embodiment include a pair of first flat spring portions 60d and a pair of second flat spring portions 60e. The pair of first flat spring portions 60d are brought into contact with the first magnet 4A. The pair of second flat spring portions 60e are brought into contact with the second magnet 4B.

The pair of first flat spring portions 60d are brought into contact with both end portions of the first long side 4a of the first magnet 4A, respectively. Further, the pair of second flat spring portions 60e are brought into contact with both end portions of the first long side 4a of the second magnet 4B, respectively.

The pair of first flat spring portions 60d are bent by the first magnet 4A through insertion of the first magnet 4A into the accommodation hole. Further, the pair of second flat spring portions 60e are bent by the second magnet 4B through insertion of the second magnet 4B into the accommodation hole.

However, in FIG. 9, for illustration of the shape of the first flat spring portions 60d, the first flat spring portions 60d before being bent are illustrated in a state of overlapping the first magnet 4A. Further, for illustration of the shape of the second flat spring portions 60e, the second flat spring portions 60e before being bent are illustrated in a state of overlapping the second magnet 4B.

At both side portions of the first flat spring portion 60d in the edge portion of the first inclination portion 60b and at both side portions of the second flat spring portion 60e in the edge portion of the second inclination portion 60c, a pair of recesses 60f forming a clearance with respect to a corresponding one of the magnets 4A and 4B are formed.

Figure 10:
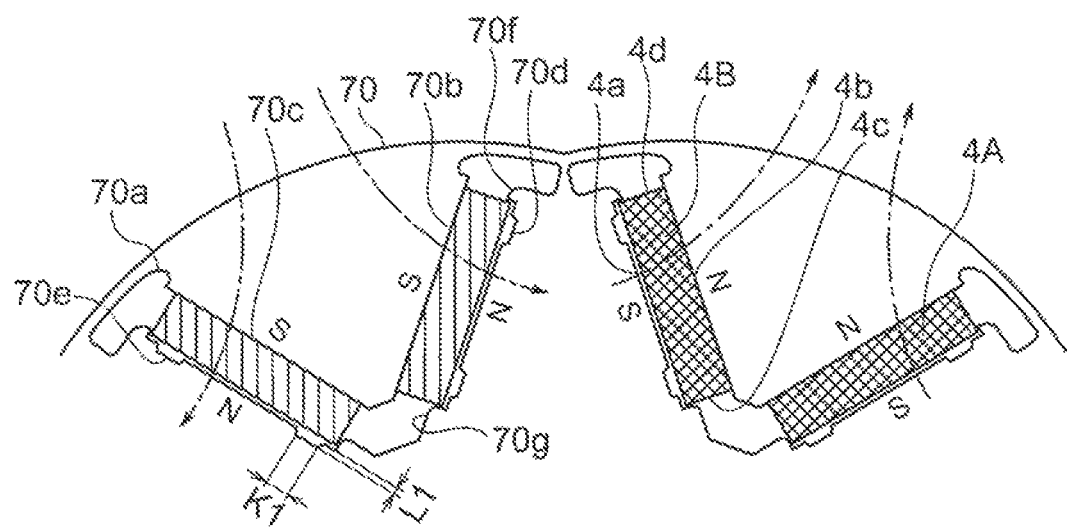
FIG. 10 is a plan view for illustrating a part of a second core sheet of the rotor core of the second embodiment.

In FIG. 10, the second core sheet 70 has a plurality of second sheet holes 70a. The second sheet holes 70a each form a part of a corresponding one of the accommodation holes. Therefore, a shape of each of the second sheet holes 70a is a V-shape that is open toward the radially outer side of the rotor core.

The second sheet holes 70a each include a first inclination portion 70b and a second inclination portion 70c. The first inclination portion 70b is inclined toward one side with respect to the radial direction of the rotor core. The second inclination portion 70c is inclined toward the other side.

A pair of first concave portions 70d for allowing the pair of first flat spring portions 60d bent by the first magnet 4A to escape are formed at the edge portion of the first inclination portion 70b. A pair of second concave portions 70e for allowing the pair of second flat spring portions 60e bent by the second magnet 4B to escape are formed at the edge portion of the second inclination portion 70c.

Further, the edge portion of the first inclination portion 70b and the edge portion of the second inclination portion 70c each have a first projection portion 70f and a second projection portion 70g configured to regulate movement of a corresponding one of the first magnet 4A and the second magnet 4B in a width direction.

Figure 11:
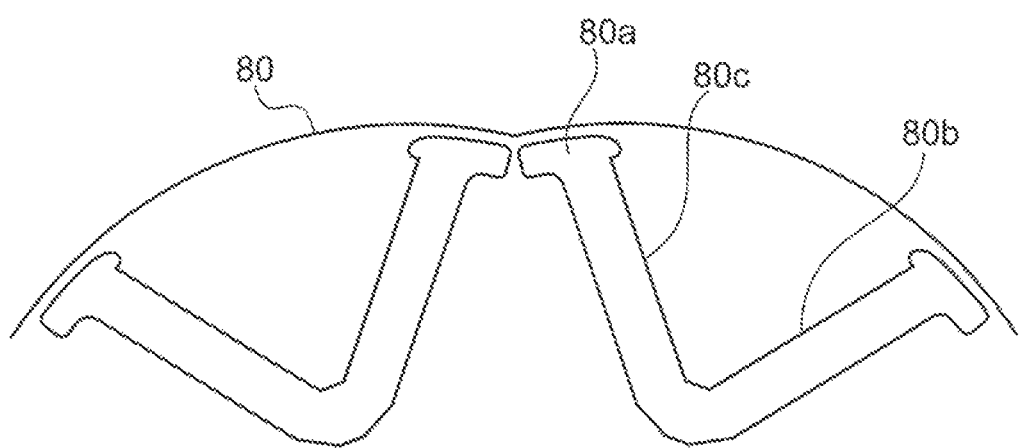
FIG. 11 is a plan view for illustrating a part of a third core sheet of the rotor core of the second embodiment.

In FIG. 11, the third core sheet 80 has a plurality of third sheet holes 80a. The third sheet holes 80a each form a part of a corresponding one of the accommodation holes. Therefore, a shape of the third sheet hole 80a is a V-shape that is open toward the radially outer side of the rotor core.

The third sheet holes 80a each include a first inclination portion 80b and a second inclination portion 80c. The first inclination portion 80b is inclined toward one side with respect to the radial direction of the rotor core. The second inclination portion 80c is inclined toward the other side. In FIG. 11, the first magnet 4A and the second magnet 4B are omitted.

Further, an edge portion of the first inclination portion 80b opposed to the contact surface 4e of the first magnet 4A is parallel to the contact surface 4e. Further, an edge portion of the second inclination portion 80c opposed to the contact surface 4e of the second magnet 4B is parallel to the contact surface 4e. All other configurations are similar or identical to those of the first embodiment.

Even in such a V-shaped magnet arrangement, similarly to the first embodiment, a width M1 of each of the first and second flat spring portions 60d and 60e, a width K1 and a depth L1 of each of the first and second concave portions 70d and 70e, and a dimension of a clearance N1 are determined. The width M1 is given at two positions, and hence a sum of the widths M1 may be considered as the width.

Also in the IPM rotor according to the second embodiment, the size of the clearance is set based on a relationship between a magnitude of a pressing force of the first flat spring portions 60d on the first magnet 4A and variation in pressing force and on a relationship between a magnitude of a pressing force of the second flat spring portions 60e on the second magnet 4B and the variation in pressing force. Therefore, the pressing force on the first magnet 4A and the second magnet 4B can be further stabilized.

In the configuration of the second embodiment, the magnetic paths indicated by arrows of one-dot chain lines of FIG. 10 are generated. In contrast, the pair of first flat spring portions 60d are brought into contact with both end portions of the first long side 4a of the first magnet 4A. Further, the pair of second flat spring portions 60e are brought into contact with both end portions of the first long side 4a of the second magnet 4B. Therefore, the reduction of the magnetic field caused by providing the first flat spring portions 60d and the second flat spring portions 60e can be suppressed.

At the time of inserting the first magnets 4A and the second magnets 4B, it is preferred to insert all of any one of the first magnets 4A and the second magnets 4B and thereafter insert all of the other one of the first magnets 4A and the second magnets 4B. With this, bias of the distortion of the rotor core caused by the insertion can be prevented.

Further, in the configurations of the first and second embodiments, the projection portions may be formed on at least any one of the first core sheet or the third core sheet. That is, components other than the flat spring portions of the first core sheet and the concave portions of the second core sheet may be arranged on any of the core sheets.

Further, the number and arrangement of the first core sheets, second core sheets, and third core sheets are not limited to those given in the example illustrated in FIG. 6.

Further, the third core sheet may be omitted.

REFERENCE SIGNS LIST

1 IPM rotor, 3 rotor core, 3a accommodation hole, 4 magnet, 4A, first magnet, 4B second magnet, 4a first long side, 4b second long side, 4e contact surface, 20, 60 first core sheet, 20a, 60a first sheet hole, 20b first inner edge portion, 20e flat spring portion, 20f, 60f recess, 30, 70 second core sheet, 30a, 70a second sheet hole, 30b second inner edge portion, 30e concave portion, 40, 80 third core sheet, 40a, 80a third sheet hole, 40b third inner edge portion, 60b, 70b first inclination portion, 60c, 70c second inclination portion, 60d first flat spring portion, 60e second flat spring portion, 70d first concave portion, 70e second concave portion

The invention claimed is:

1. An IPM rotor, comprising:
a rotor core which includes a plurality of core sheets, and has an accommodation hole; and
a magnet accommodated in the accommodation hole,
wherein the plurality of core sheets include a first core sheet and a second core sheet,
wherein the first core sheet has a first sheet hole forming a part of the accommodation hole,
wherein the second core sheet has a second sheet hole forming a part of the accommodation hole,
wherein the first sheet hole has an edge portion having a flat spring portion which is bent by the magnet through insertion of the magnet into the accommodation hole,
wherein the second sheet hole has an edge portion having a concave portion which allows the flat spring portion bent by the magnet to escape,
wherein a pair of recesses forming a clearance with respect to the magnet are formed at both side portions of the flat spring portion of the edge portion of the first sheet hole, and
wherein a size of the clearance is set based on a relationship between a magnitude of a pressing force of the flat spring portion on the magnet and variation in the pressing force.

2. The IPM rotor according to claim 1, wherein a first bottom surface of the recess and a second bottom surface of the concave portion are located at the same position in a radial direction of the rotor core.

3. The IPM rotor according to claim 1, wherein a length of the flat spring portion is two to three times larger than a thickness of the first core sheet.

4. The IPM rotor according to claim 3,
wherein the second core sheet includes two or more second core sheets which are successively laminated adjacent to the first core sheet, and
wherein a lamination thickness of the second core sheets which are successively laminated is equal to or larger than a length of the flat spring portion.

5. The IPM rotor according to claim 1,
wherein the plurality of core sheets further include a third core sheet,
wherein the third core sheet has a third sheet hole forming a part of the accommodation hole,
wherein the third sheet hole has an edge portion opposed to a contact surface of the magnet that is a surface with which the flat spring portion is brought into contact, and the edge portion of the third sheet hole is parallel to the contact surface, and
wherein the third core sheet is laminated adjacent to at least one of the first core sheet or the second core sheet.

6. The IPM rotor according to claim 1, wherein a width of the flat spring portion is equal to or smaller than 30% of a length of the magnet in a width direction of the flat spring portion.

7. The IPM rotor according to claim 1,
wherein the magnet has an outer shape of a rectangular parallelepiped, and
wherein, when seen on a cross section perpendicular to an axial direction of the rotor core,
the accommodation hole is arranged along an arc of a circle having its center at a rotation center of the rotor core,
the magnet has a rectangular sectional shape including:
a first long side which is a long side of the rotor core on a radially inner side; and
a second long side which is a long side on a radially outer side, and
the flat spring portion is brought into contact with a center portion of the first long side.

8. The IPM rotor according to claim 1,
wherein the first sheet hole and the second sheet hole each have a V-shape that is open toward a radially outer side of the rotor core,
wherein the first sheet hole and the second sheet hole each include:
a first inclination portion which is inclined toward one side with respect to a radial direction of the rotor core; and
a second inclination portion which is inclined toward the other side, wherein the magnet includes:
  a first magnet arranged at the first inclination portion; and
  a second magnet arranged at the second inclination portion,
wherein, when seen on a cross section perpendicular to an axial direction of the rotor core, the first magnet and the second magnet each have a rectangular sectional shape including:
  a first long side which is a long side on a radially inner side of the rotor core; and
  a second long side which is a long side on a radially outer side, and
wherein the flat spring portion includes:
  a pair of first flat spring portions which are brought into contact with both end portions of the first long side of the first magnet; and
  a pair of second flat spring portions which are brought into contact with both end portions of the first long side of the second magnet.

* * * * *